United States Patent [19]

Shields et al.

[11] Patent Number: 5,531,817
[45] Date of Patent: Jul. 2, 1996

[54] USE OF HIGH VISCOSITY, MELTABLE GEL INKS FOR CONTROLLING BLEED

[75] Inventors: James P. Shields, Philomath; John R. Moffatt, Corvallis, both of Oreg.

[73] Assignee: Hewlett-Packard Company, Palo Alto, Calif.

[21] Appl. No.: 300,495

[22] Filed: Sep. 1, 1994

[51] Int. Cl.$^6$ .......................... C09D 11/02; C09D 11/04; C09D 11/14

[52] U.S. Cl. ................... 106/22 R; 106/22 E; 106/22 F; 106/22 H; 106/24 R; 106/25 R; 106/25 A

[58] Field of Search ................................. 106/22 R, 22 F, 106/22 H, 24 R, 25 R, 25 A, 22 E

[56] References Cited

U.S. PATENT DOCUMENTS

| | | | |
|---|---|---|---|
| 5,021,802 | 6/1991 | Allred | 346/1.1 |
| 5,106,416 | 4/1992 | Moffatt et al. | 106/22 R |
| 5,108,501 | 4/1992 | Moffatt | 106/22 R |
| 5,108,504 | 4/1992 | Johnson et al. | 106/25 A |
| 5,116,409 | 5/1992 | Moffatt | 106/22 R |
| 5,133,803 | 7/1992 | Moffatt | 106/25 A |
| 5,226,957 | 7/1993 | Wickramanayake et al. | 106/25 R |

*Primary Examiner*—Helene Klemanski

[57] ABSTRACT

Color bleed (the invasion of one color into another on the surface of the print medium) using ink-jet inks is controlled by employing either high molecular weight polymers that exhibit a reversible gelling nature with heat or certain amine oxide surfactants that undergo sol-gel transitions. The inks of the invention further include a vehicle and a dye. The vehicle typically comprises a low viscosity, high boiling point solvent and water. Certain high molecular weight polymers, under the correct solution conditions, can form gels which can be subsequently melted by heating of the gel. When the melted gel is cooled, it will then reform into a gel. The viscosity of an ink employing such a gel can be reduced to a viscosity low enough to permit jetting from the print cartridge. After leaving the print cartridge, the melted gel will again reform into a highly viscous gel to immobilize the droplet of ink and prevent its migration on the media. Therefore, two drops of different colors, when printed next to one another will thus be inhibited from migrating or bleeding into one another.

19 Claims, No Drawings

USE OF HIGH VISCOSITY, MELTABLE GEL INKS FOR CONTROLLING BLEED

CROSS-REFERENCE TO RELATED APPLICATION

The present application is related to U.S. Pat. No. 5,133,803 issued Jul. 28, 1992, entitled "High Molecular Weight Colloids Which Control Bleed" and assigned to the same assignee as the present application.

TECHNICAL FIELD

The present invention relates to inks employed in ink-jet printing, especially in thermal ink-jet printing, and, more particularly, to color ink compositions in which color bleed is substantially reduced or even eliminated.

BACKGROUND ART

Heavy dye loads on bond paper of various colored inks can lead to bleed and reduction of waterfastness. Bleed, as used herein, is the invasion of one color into another color on paper or other media. This is in contradistinction to uses of the term in the prior art, which tend to define "bleed" in the context of ink of a single color following the fibers of the paper.

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alphanumeric characters, performs area-fill, and provides other print capabilities on the medium.

Many inks that are described for use in ink-jet printing are usually associated with non-thermal ink-jet printing. An example of such non-thermal ink-jet printing is piezoelectric ink-jet printing, which employs a piezoelectric element to expel droplets of ink to the medium. Inks suitably employed in such non-thermal applications often cannot be used in thermal ink-jet printing, due to the effect of heating on the ink composition.

U.S. Pat. No. 5,021,802 discloses a thermally reversible sol-gel phase change ink or bubble jet ink. The inks are thermally reversible sol-gels which are gels at ambient temperatures and sols at temperatures between about 40° and 100° C.

A need remains for ink compositions for use in ink-jet printing, particularly thermal ink-jet printing, which do not evidence bleed, as defined herein, and yet which possess relatively long shelf life and other desirable properties of such inks.

DISCLOSURE OF INVENTION

In accordance with the invention, ink compositions are provided in which bleed is controlled. The ink compositions comprise (a) a color bleed control agent selected from the group consisting of (1) about 0.05 to 2 wt % of a high molecular weight polymer having a molecular weight of at least 10,000 and (2) about 15 to 45 wt % of a surfactant; (b) about 0.5 to 20 wt % of one or more low vapor pressure solvents, (c) one or more water-soluble dyes, and (d) water. The inks also include one or more biocides, fungicides, and/or slimicides, as is commonly practiced in the art.

The inks of the invention evidence little or no color bleed. Further, these inks are also applicable to other ink-jet technologies.

BEST MODES FOR CARRYING OUT THE INVENTION

In accordance with the invention, ink compositions are provided in which bleed is controlled. The ink compositions comprise (a) about 0.05 to 2 wt % of a high molecular weight polymer, (b) about 0.5 to 20 wt % of one or more low vapor pressure solvents, (c) one or more water-soluble dyes, and (d) the balance water. The inks also include one or more biocides, fungicides, and/or slimicides, as is commonly practiced in the art. Alternatively, as described in greater detail below, the high molecular weight polymer can be replaced by, for example, an amine oxide surfactant, having a concentration within the range of about 15 to 45 wt %.

All concentrations herein are in weight percent, unless otherwise indicated. The purity of all components is that employed in normal commercial practice for thermal ink-jet inks.

As used herein, the term "low vapor pressure solvent" refers to a solvent having a vapor pressure that is lower than that of water. Low vapor pressure solvents can include, but are not restricted to, glycols such as ethylene glycol, diethylene glycol, triethylene glycol, tetraethylene glycol, propylene glycol, polyethylene glycol, polypropylene glycol, and derivatives thereof; diols such as butanediol, pentanediol, hexanediol, and homologous diols; glycol esters such as propylene glycol laurate; mono and di glycol ethers, including ethylene glycol mono methyl ether and ethylene glycol mono butyl ether, diethylene glycol ethers, diethylene glycol mono ethyl ether, diethylene glycol mono butyl ether, and diethylene glycol mono hexyl ether, propylene glycol ether, dipropylene glycol ether, and triethylene glycol ether; long chain alcohols such as butyl alcohol, pentyl alcohol, and homologous alcohols; and other solvents such as esters, ketones, lactones such as γ-butyrolactone, lactams such as N-pyrrolidone, 2-pyrrolidone, and N-(2-hydroxy-ethyl) pyrrolidone, and glycerols and their derivatives.

Microbial reagents include, but are not limited to, NUOSEPT (Nudex, Inc., a division of Huls America), UCARCIDE (Union Carbide), VANCIDE (RT Vanderbilt Co.), and PROXEL (ICI Americas).

Dyes include, but are not limited to, anionic water-soluble dyes such as C.I. Acid Blue 9 (#42090), C.I. Acid Red 18 (#18), C.I. Acid Red 27 (#16185), C.I. Acid Red 52 (#45100), C.I. Acid Yellow 23 (#19140), C.I. Direct Blue 199 (#74190), C.I. Direct Yellow 86 (#29325) and their monovalent alkali earth cations such as $Na^+$, $Li^+$, $K^+$, $NH_4^+$, and substituted ammonium salts.

The concentration of the dye(s) may range from about 0.1 to 10 wt % of the ink composition.

In the practice of the invention, color bleed resulting from the use of ink-jet inks in thermal ink-jet printers is alleviated by employing high molecular weight polymers. As used herein the term "high molecular weight polymer" refers to a polymer having a molecular weight of at least about 10,000.

The polymers disclosed herein for use in thermal ink-jet printing are effective at about 0.05 to 2.0 wt % in alleviating bleed. In a preferred embodiment, the polymer employed is a large polysaccharide such as gellan gum. Certain polymers, under the correct solution conditions, can form gels which can be subsequently melted by heating of the gel. When the melted gel is cooled, it will then reform into a gel. The important characteristic of this melting/setting process is the viscosity change which occurs. The viscosity of the ink in the gel state is often too high to readily jet from a conventional thermal ink-jet print cartridge. However, through heating, the viscosity of the ink can be reduced to a viscosity low enough to permit jetting from the print cartridge. This range of viscosity is about 1.2 to 12 cp. This viscosity change enables two important events to occur. After leaving the print cartridge, the melted gel will again reform into a highly viscous gel. It is this action which helps to immobilize the droplet of ink and therefore prevent its migration on the media. Therefore, two drops of different colors, when printed next to one another, will tend to gel or set as they land on the print medium and cool to ambient temperature and will thus be inhibited from migrating or bleeding into one another.

One substance that is known to exhibit this reversible gelling nature with heat is gellan gum, available from Kelco, San Diego, Calif. (a division of Merck and Co., Inc.). For a 0.2% gellan gum level in water with Na ion concentrations ranging from 50 to 200 milli-Moles (mM), the setting point ranges from about 35° to 50° C. and the melting point from about 80° to 100° C.

For example, an ink composition utilizing gellan gum consists essentially of:

(a) about 4 to 15 wt % 1,5-pentanediol;

(b) about 0.05 to 2 wt % gellan gum;

(c) at least one water-soluble dye; and (d) the balance water.

Other high molecular weight polymers include alginic acid, carrageenan, fucoidan, laminaran, pectin, and gums selected from the group consisting of xanthan, arabic, ghatti, guar, locust bean, tragacanth, karaya, and inulin. To the extent that these high molecular weight polymers exhibit a reversible gelling nature, they, too, are also useful in the practice of the invention.

The print cartridges containing the inks of the invention are easily modified to include a simple resistance heater that heats the ink in the pen reservoir to a temperature that reduces the viscosity of the ink to the above-indicated value prior to jetting the ink from the pen.

Certain surfactants can be used to modify the solubility and the gel-sol transition temperature of the high molecular weight polymers. These surfactants include amphoteric, zwitterionic, non-ionic, cationic, and anionic surfactants. The amphoteric surfactants preferably comprise N-(Z-9-octadecenyl)-N,N-dimethyl-N-amine oxide (OOAO) and other amine oxides, the zwitterionic surfactants preferably comprise sulfobetaines, the non-ionic surfactants preferably comprise polyalkyloxy surfactants such as the Pluronic series, available from Union Carbide, the cationic surfactants preferably comprise cetyl trimethyl ammonium bromide, and the anionic surfactants preferably comprise sodium dodecyl sulfate.

The concentration of such surfactants is within the range of about 0.1 to 10 wt % of the ink composition, and depends on the effect of the surfactant on gel formation. For example, if surfactant present in the ink enhances gel formation, then less polymer is required, and if surfactant presence attenuates gel formation, then more polymer can be added.

Certain other surfactants can be used that undergo sol-gel transitions without the presence of gel-forming high molecular weight polymers. These surfactants include N-octadecyl-N,N-dimethyl-N-amine oxide (NOAO), OOAO (see above), and N-eicosyl-N,N-dimethyl-N-amine oxide (NBAO).

In the case in which surfactant is used in place of the high molecular weight polymer, the concentration of the surfactant is within the range of about 15 to 45 wt %, and preferably about 30 wt %.

INDUSTRIAL APPLICABILITY

The ink compositions of the invention are expected to find use in thermal ink-jet inks, especially color inks, where bleed of one color into another is a concern. The ink compositions of the invention reduce or even eliminate such color bleed.

Thus, there has been disclosed a process for controlling color bleed and thermal ink-jet compositions used in such process. It will be readily apparent to those skilled in this art that various changes and modifications of an obvious nature may be made, and all such changes and modifications are considered to fall within the scope of the invention, as defined by the appended claims.

What is claimed is:

1. A thermal ink-jet ink having the following composition:

(a) a color bleed control agent selected from the group consisting of (1) about 0.05 to 2 wt % of a high molecular weight polymer having a molecular weight of at least 10,000 and (2) about 15 to 45 wt % of an amine oxide surfactant;

(b) about 0.5 to 20 wt % of at least one low vapor pressure solvent;

(c) at least one water-soluble dye; and (f) the balance water, wherein said thermal ink-jet ink is a gel at ambient temperatures and is adapted to be heated as necessary to achieve a temperature such that said thermal ink-jet ink has a viscosity within the range of about 1.2 to 12 cP immediately prior to jetting said thermal ink-jet ink from an ink-jet pen.

2. The thermal ink-jet ink of claim 1 wherein said high molecular weight polymer is selected from the group consisting of alginic acid, carrageenan, fucoidan, laminaran, and gums selected from the group consisting of xanthan, arabic, ghatti, guar, locust bean, tragacanth, karaya, and inulin.

3. The thermal ink-jet ink of claim 2 wherein said high molecular weight polymer consists essentially of gellan gum.

4. The thermal ink-jet ink of claim 1 wherein said solvent is selected from the group consisting of ethylene glycol, diethylene glycol, triethylene glycol, tetraethylene glycol, propylene glycol, polyethylene glycol, polypropylene glycol, and derivatives thereof; butanediol, pentanediol, hexanediol, and homologous diols; propylene glycol laurate; ethylene glycol monobutyl ether, diethylene glycol mono ethyl ether, diethylene glycol mono butyl ether, diethylene glycol mono hexyl ether, propylene glycol ether, dipropylene glycol ether, and triethylene glycol ether; butyl alcohol, pentyl alcohol, and homologous alcohols, γ-butyrolactone, N-pyrrolidone and N-(2-hydroxy-ethyl)pyrrolidone, and glycerols and their derivatives.

5. The thermal ink-jet ink of claim 1 wherein said dye is a water-soluble anionic dye selected from the group consisting of C.I. Acid Blue 9, C.I. Acid Red 18, C.I. Acid Red 27, C.I. Acid Red 52, C.I. Acid Yellow 23, C.I. Direct Blue 199, and C.I. Direct Yellow 86.

6. The thermal ink-jet ink of claim 1 further comprising about 0.1 to 10 wt % of a surfactant selected from the group consisting of amphoteric, zwitterionic, non-ionic, cationic, and anionic surfactants.

7. The thermal ink-jet ink of claim 6 wherein said amphoteric surfactant comprises an amine oxide, said zwitterionic surfactant comprises a sulfobetaine, said cationic surfactant comprises cetyl trimethyl ammonium bromide, and said anionic surfactant comprises sodium dodecyl sulfate.

8. The thermal ink-jet ink of claim 7 wherein said amine oxide surfactant is selected from the group consisting of N-octadecyl-N,N-dimethyl-N-amine oxide, N-(Z-9 -octadecenyl)-N,N-dimethyl-N-amine oxide, and N-eicosyl-N,N-di-methyl-N-amine oxide.

9. The thermal ink-jet ink of claim 1 wherein said ink consists essentially of:
 (a) about 4 to 15 wt % 1,5-pentanediol;
 (b) about 0.05 to 2 wt % gellan gum;
 (c) said at least one water-soluble dye; and
 (d) the balance water.

10. A process for controlling color bleed in inks employed in thermal ink-jet printing comprising
 (a) formulating an ink having the following composition and being a gel at ambient temperatures:
  (1) a color bleed control agent selected from the group consisting of (i) about 0.05 to 2 wt % of a high molecular weight polymer having a molecular weight of at least 10,000 and (ii) about 15 to 45 wt % of an amine oxide surfactant;
  (2) about 0.5 to 20 wt % of at least one low vapor pressure solvent;
  (3) at least one water-soluble dye; and
  (4) the balance water, and
 (b) heating said ink as necessary to achieve a temperature such that said ink has a viscosity within the range of about 1.2 to 12 cP; and
 (c) printing said ink on a print medium.

11. The process of claim 10 wherein said high molecular weight polymer is selected from the group consisting of alginic acid, carrageenan, fucoidan, laminaran, and gums selected from the group consisting of gellan, xanthan, arabic, ghatti, guar, locust bean, tragacanth, karaya, and inulin.

12. The process of claim 11 wherein said high molecular weight polymer consists essentially of gellan gum.

13. The process of claim 10 wherein said solvent is selected from the group consisting of ethylene glycol, diethylene glycol, triethylene glycol, tetraethylene glycol, propylene glycol, polyethylene glycol, polypropylene glycol, and derivatives thereof; butanediol, pentanediol, hexanediol, and homologous diols; propylene glycol laurate; ethylene glycol monobutyl ether, diethylene glycol mono ethyl ether, diethylene glycol mono butyl ether, diethylene glycol mono hexyl ether, propylene glycol ether, dipropylene glycol ether, and triethylene glycol ether; butyl alcohol, pentyl alcohol, and homologous alcohols, γ-butyro-lactone, N-pyrrolidone and N-(2 -hydroxyethyl)pyrrolidone, and glycerols and their derivatives.

14. The process of claim 10 wherein said dye is a water-soluble anionic dye selected from the group consisting of C.I. Acid Blue 9, C.I. Acid Red 18, C.I. Acid Red 27, C.I. Acid Red 52, C.I. Acid Yellow 23, C.I. Direct Blue 199, and C.I. Direct Yellow 86.

15. The process of claim 10 wherein said high molecular weight polymer has a gel-sol transition temperature and wherein said sol-gel transition temperature is modified by adding a surfactant to said ink containing said high molecular weight polymer, said surfactant having a concentration within the range of about 0.1 to 10 wt %.

16. The process of claim 10 wherein said surfactant is selected from the group consisting of amphoteric, zwitterionic, non-ionic, cationic, and anionic surfactants.

17. The process of claim 16 wherein said amphoteric surfactant comprises an amine oxide, said zwitterionic surfactant comprises a sulfobetaine, said cationic surfactant comprises cetyl trimethyl ammonium bromide, and said anionic surfactant comprises sodium dodecyl sulfate.

18. The process of claim 17 wherein said amine oxide surfactant is selected from the group consisting of N-octadecyl-N,N-dimethyl-N-amine oxide, N-(Z-9 -octadecenyl)-N,N-dimethyl-N-amine oxide, and N-eicosyl-N,N-dimethyl-N-amine oxide.

19. The process of claim 10 wherein said ink consists essentially of:
 (a) about 4 to 15 wt % 1,5-pentanediol;
 (b) about 0.05 to 2 wt % gellan gum;
 (c) said at least one water-soluble dye; and
 (d) the balance water.

* * * * *